United States Patent [19]

Sosa et al.

[11] Patent Number: 4,861,827

[45] Date of Patent: Aug. 29, 1989

[54] CONTINUOUS PROCESS FOR THE PRODUCTION OF HIGH IMPACT POLYSTYRENE USING NON-ACID FORMING INITIATORS

[75] Inventors: Jose M. Sosa, Big Spring; Jeffrey Morris, Roanoke, both of Tex.

[73] Assignee: Fina Technology, Inc., Dallas, Tex.

[21] Appl. No.: 138,089

[22] Filed: Dec. 24, 1987

[51] Int. Cl.$^4$ .................... C08F 279/02; C08F 4/04
[52] U.S. Cl. ........................... 525/54; 525/260; 525/263; 525/265; 525/316
[58] Field of Search ................ 525/54, 260, 263, 316, 525/265

[56] References Cited

U.S. PATENT DOCUMENTS

| | | |
|---|---|---|
| 3,243,481 | 3/1966 | Ruffing et al. . |
| 3,311,675 | 3/1967 | Doak et al. ............ 525/54 |
| 3,658,946 | 4/1972 | Bronstert et al. . |
| 4,035,445 | 7/1977 | Baumgartner ............ 525/54 |
| 4,212,789 | 7/1980 | Anspon . |
| 4,250,270 | 2/1981 | Farrar ............ 525/54 |
| 4,451,612 | 5/1984 | Wang et al. . |
| 4,567,232 | 1/1986 | Echte et al. . |

OTHER PUBLICATIONS

General Catalog, Peroxides Specialty Chemicals, Pennwalt Corp. (6/1982).
Akzo Chemie, Noury Initiators Major Decomposition Products of Organic Peroxides and Azo Compounds, received 1/1984, publication date unknown.

Primary Examiner—Wilbert J. Briggs, Sr.
Attorney, Agent, or Firm—William Berridge; Michael J. Caddell

[57] ABSTRACT

A continuous process for the production of high impact polystyrene using a free radical initiator which decomposes to form only non-acid decomposition by-products.

13 Claims, 3 Drawing Sheets

CONTINUOUS PROCESS FOR THE PRODUCTION OF HIGH IMPACT POLYSTYRENE USING NON-ACID FORMING INITIATORS

FIELD OF THE INVENTION

The present invention relates to a process for producing high impact polystyrene. More particularly, the invention relates to a continuous flow process for producing polystyrene having discrete particles of rubber included therein.

BACKGROUND OF THE INVENTION

It is well known that rubber-reinforced polymers of monovinylidene aromatic compounds, such as styrene, alpha-methylstyrene and ring-substituted styrene, are useful for a variety of purposes. For example, rubber-reinforced styrene polymers having discrete particles of a cross-linked rubber, e.g., polybutadiene, dispersed throughout the styrene polymer matrix can be used in a variety of diverse applications including refrigerator linings, packaging applications, furniture, household appliances and toys. Such rubber-reinforced polymers are commonly referred to as "high impact polystyrene" or "HIPS".

One known process for producing HIPS polymers is the batch or suspension process wherein polymerizatin occurs within a single reaction vessel. An advantage of the batch process is the ease with which HIPS production can be controlled and monitored due to the use of a single reaction vessel throughout the entire polymerization process. However, the batch process suffers from a number of inherent disadvantages, such as low yields and extended down-time periods, which render it unsuitable for commercial purposes.

In order to overcome the commercial difficulties of the batch process, several continuous flow processes for the production of HIPS have been proposed. Such known processes employ a plurality of serially arranged reaction vessels wherein the degree of polymerization increases from one vessel to the next. See, for example, U.S. Pat. No. 3,658,946 to Bronstert et al., U.S. Pat. No. 3,243,481 to Ruffing et al., U.S. Pat. No. 4,451,612 to Wang et al. and U.S. Pat. No. 4,567,232 to Echte et al.

Several of these continuous processes generally suggest that some type of devolatilization zone and recycle pathway be used for returning solents and unreacted monomer to one of the polymerization reaction zones. However, the recycle stream leaving the devolatilization zone contains a substantial amount of impurities, including free radical initiator decomposition by-products, which can adversely affect the continuous HIPS production process when the impurities are introduced into a polymerization zone. In fact, the initiator decomposition by-products can destroy the effectiveness of a free radical initiator and inhibit polymerization for a significant period of time, even indefinitely, when the recycle stream is fed into the initial polymerization reaction zone. Further, such impurities can impart undesirable physical characteristics, such as discoloration, to the HIPS polymers.

None of the above patents recognizes either the cause or the effects of recycle stream impurities due to initiator decomposition. Similarly, none of those processes provides any means for avoiding the adverse effects of these impurities upon a continuous flow process for producing HIPS polymers.

SUMMARY OF THE INVENTION

The present invention overcomes the disadvantages of known continuous HIPS production processes. In particular, the present invention provides a continuous flow process wherein specific types of free radical initiators are employed to induce polymerization of the vinylaromatic monomer. More particularly, the free radical initiators useful in the process of this invention decompose to form non-acid decomposition by-products.

BRIEF DESCRIPTION OF THE DRAWINGS

Other objects and further features of the present invention will be better understood when considered in conjunction with the accompanying drawings, wherein like numerals denote corresponding parts, and wherein.

DETAILED DESCRIPTION OF THE INVENTION

Figure 1:
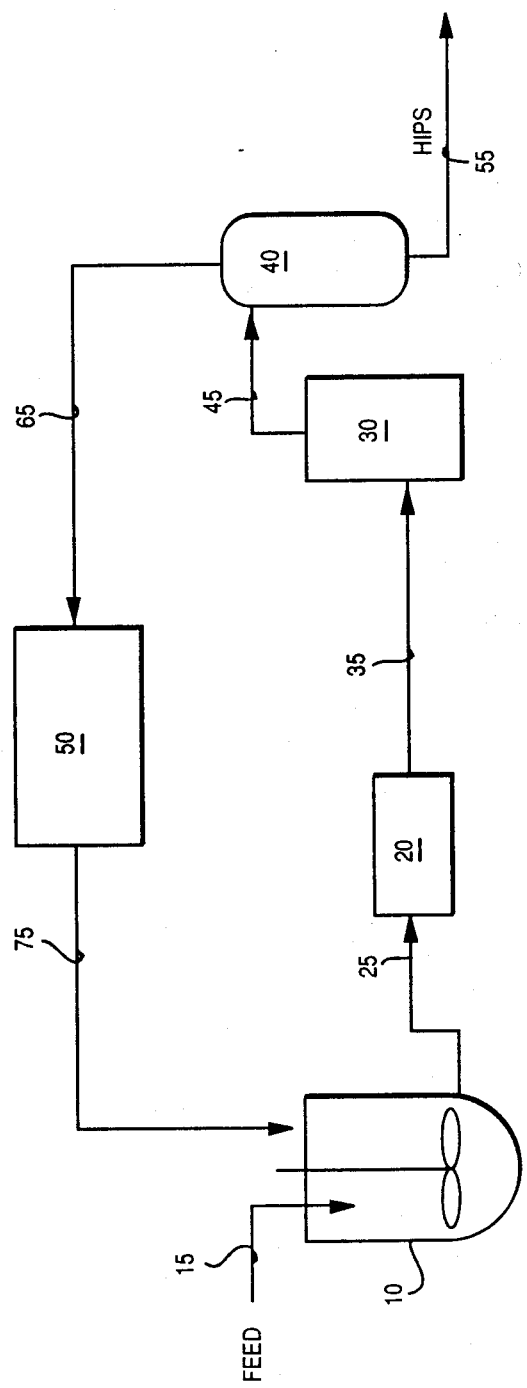
FIG. 1 is a schematic representation of reaction vessels and apparatus useful in the process of the present invention.
Figure 2:
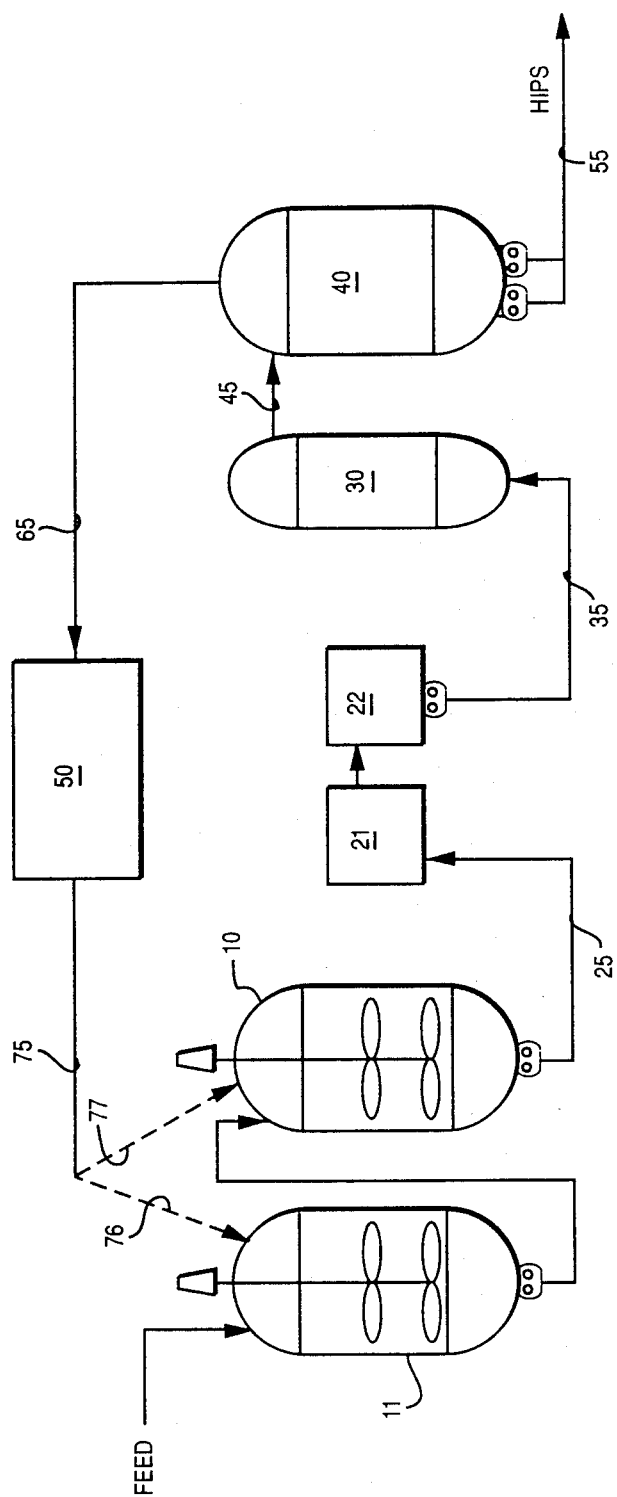
FIG. 2 is a schematic representation of another embodiment of reaction vessels and apparatus useful in the process of the present invention.

Referring now to FIGS. 1 and 2, there is shown a schematic representation of a series of reaction vessels and apparatus useful in the practice of the continuous HIPS production process of the present invention.

Styrene, polybutadiene, a free radical initiator and additional components such as solvents, antioxidants, and other additives are fed to a polymerization reactor 10 through a feed line or lines generally indicated at 15. As used herein, the term "styrene" includes a variety of substituted styrenes, e.g. alpha-methyl styrene, ring-substituted styrenes such as p-methylstyrene and p-chlorostyrene, as well as unsubstituted styrene. Typically, the mixture in polymerization reactor 10 will comprise about 75 to 99% by weight styrene, about 1 to 15% by weight polybutadiene, about 0.001 to 0.2% by weight free radical initiator, and about 0.1 to 6% by weight of additional components.

Polymerization reactor 10 is preferably a continuously stirred tank reactor which operates at a percent solids level above the inversion point of the polymer system. That is, the polymerization reactor 10 operates at a percent solids level such that the system has a continuous phase of polystyrene and a discontinuous phase of dispersed droplets of rubber, or preferably, the droplets are a mixture of polystyrene and rubber.

The apparatus used in practicing the present invention may further comprise an additional polymerization reactor 11 which is operated at pre-inversion conditions, i.e. the continuous phase in the pre-inversion reactor 11 is a styrene-rubber solution and the discontinuous phase is polystyrene. This pre-inversion reactor is located directly before the polymerization reactor 10, such that the styrene, polybutadiene, free radical initiator and other components are fed to the pre-inversion reactor 11 and the mixture exiting the pre-inversion reactor is then fed to polymerization reactor 10. The pre-inversion reactor is preferably a continuously stirred tank reactor.

Output from the polymerization reactor 10 is fed to another polymerization reactor through line 25 and post-inversion stage polymerization occurs in this next polymerization reactor. Preferably, this next polymerization reactor is a linear-flow reactor, such as a plug flow reactor, but may also be a tower-type reactor or other known reactor. FIG. 1 shows a single linear-flow reactor 20; FIG. 2 shows two linear-flow reactors 21 and 22; and more linear-flow reactors may be serially connected with increased polymerization occurring in each subsequent reactor. Output from polymerization reactor(s) 20 (21, 22) is directed to a pre-heater 30 and then to a conventional devolatilizer 40, through lines 35 and 45 respectively. The resultant HIPS polymer is removed from devolatilizer 40 through line 55 and directed to a conventional pelletizer (not shown) or the like.

Unreacted styrene monomer and other volatile residual components leave devolatilizer 40 through line 65 as a recycle stream. It is preferably returned to the system, optionally after treatment in recycle treatment means 50, at the polymerization reactor 10 through line 75 as shown in FIG. 1. However, as shown in FIG. 2, besides being returned to the system at polymerization reactor 10 through line 77, it may alternatively be returned to the system at pre-inversion reactor 11 or at linear-flow reactor 21 through line 76 or 78, respectively. The recycle stream contains a variety of impurities. The major impurities in the recycle stream can be traced to reactions between species necessarily present in the recycle stream, such as styrene monomer and antioxidant, and unwanted species in the system, such as oxygen. Although some of the recycle stream impurities are innocuous, it has been unexpectedly discovered that certain impurities in the recycle stream adversely affect the polymerization process or the resultant HIPS product when the recycle stream is introduced into the system.

In the continuous process of the present invention, polymerization of the styrene monomer is initiated by the decomposition of a free radical initiator. Initiating radicals for the polymerizatin reaction are generated by the decomposition of the free radical initiator into one or more primary radicals. The primary radical then reacts with styrene monomer to initiate polymerization.

Typically, the free radical initiator is fed to the first polymerization reactor 10, which is maintained at conditions under which the free radical initiator decomposes, although it may also be fed to pre-inversion reactor 11 or linear-flow reactor 21. The free radical initiator may alternatively be selected such that it will not decompose in the polymerization reactor 10 and instead will decompose under the conditions maintained in a subsequent polymerization reactor. In this case, polymerization of styrene monomer in polymerization reactor 10 could be thermally initiated. Alternatively, a combination of two or more free radical initiators could be used, such that one free radical initiator decomposes in the polymerization reactor 10 and another free radical initiator decomposes in the linear-flow reactor 20 (21, 22).

Decomposition of the free radical initiator, which initiates polymerization of the styrene monomer, also produces decomposition by-products which do not paticipate in the polymerization reaction. In the present continuous flow process, these decomposition by-producs of the free radical initiator are removed from the HIPS polymer in the devolatilizer 40 and appear in the recycle stream.

It has been discovered that acid decomposition by-products of free radical initiators react with such initiators, thereby inhibiting styrene polymerization. It is believed that these acidic decomposition by-products adversely affect free radical initiator efficiency by inducing decomposition of the free radical initiator and/or trapping free radicals produced by spontaneous, as opposed to induced, decomposition of the free radical initiator. Thus, the acidic decomposition by-products decrease the number of free radicals available to initiate polymerization of the styrene monomer and decrease the efficiency of the free radical initiator.

Benzoic acid is one example of an acid decomposition by-product having such an adverse effect. The recognization that benzoic acid in the recycle stream inhibits styrene polymerization in the presence of a free radical initiator is particularly significant because benzoic acid is a decomposition by-product of t-butyl peroxybenzoate and dibenoyl peroxide, two of the most commonly used free radical initiators in the continuous process production of HIPS.

Examples of acid-producing free radical initiators and their corresponding acid decomposition by-products are set forth in Table 1. Those examples show that peroxy free-radical initiators are a useful class of initiators for such processes, but that acidic decomposition by-products of such peroxy free-radical initiators produce the undesirable effects which the present invention is intended to alleviate. Applicants' recognition of such acidic by-products as the source of a problem in the manufacture of HIPS products is a significant threshold aspect of the present invention.

TABLE 1

| | |
|---|---|
| Dilauroyl peroxide | Lauroyl acid |
| Dioctanoyl peroxide | Caprylic acid |
| Didecanoyl peroxide | n-Decanoic acid |
| Di-n-propionyl peroxide | Propionic acid |
| Bis(3,5,5-trimethyl hexanoyl) peroxide | 3,5,5-Trimethyl hexanoic acid |
| Dibenzoyl peroxide | Benzoic acid |
| Bis(2,4-dichlorobenzoyl) peroxide | 2,4 Dichlorobenzoic acid |
| Bis(o-methybenzoyl) peroxide | o-Methyl benzoic acid |
| Acetyl cyclohexane sulphonyl peroxide | Cyclohexane sulphonic acid |
| t-Butylperoxypivalate | Pivalic acid |
| t-Butyl peroxy-2-ethylhexanoate | 2-Ethyl caproic acid |
| t-Butyl peroxy isobutyrate | Isobutyric acid |
| t-Butyl peroxybenzoate | Benzoic acid |

All of the above-listed acid decomposition by-products are believed to have a detrimental effect on the efficiency of free radical initiation of styrene polymerization.

Figure 3:
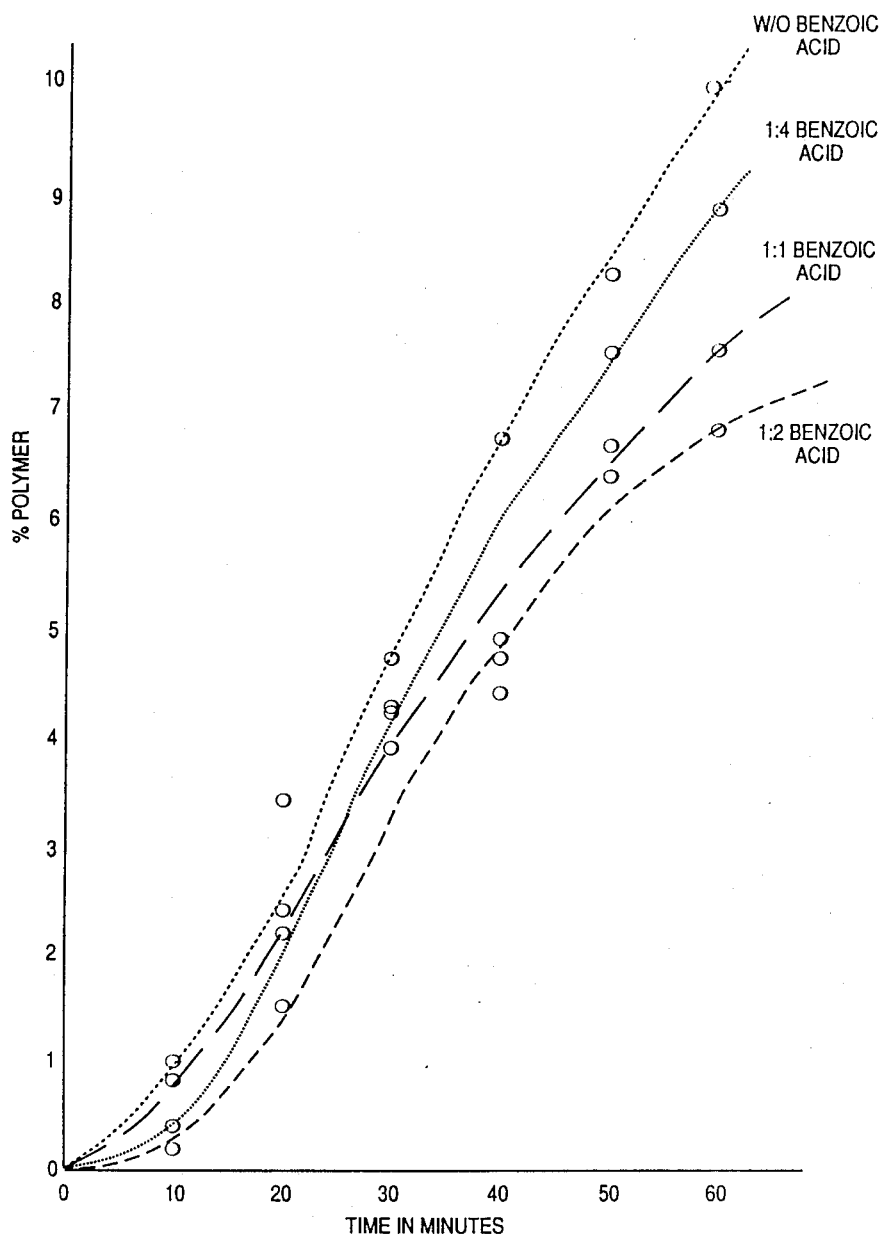
FIG. 3 is a graph showing the effect of benzoic acid on the polymerization of styrene in the presence of a free radical initiator.

FIG. 3 graphically illustrates the unexpectedly detrimental effects of benzoic acid upon styrene polymerization in the presence of the free radical initiator t-butylperoxybenzoate. This inhibitory effect of benzoic acid in the recycle stream is particularly surprising since benzoic acid is a decomposition by-product of t-butylperoxybenzoate and dibenzoyl peroxide, initiators which have long been widely used in catalyzing styrene polymerization reactions. Table 2 below lists the inhibition time and percent polymerization after specified time intervals at varying ratios of t-butylperoxybenzoate (TBP) to benzoic acid, which is graphically presented in FIG. 3.

TABLE 2
POLYMERIZATION OF STYRENE IN PRESENCE OF TBP AND BENZOIC ACID AT 120° C. UNDER $N_2$

| Ratio of TBP:Acid | % Polymer at (min) | | | | | | | (min) Inhib. Time |
|---|---|---|---|---|---|---|---|---|
| | 0 | 10 | 20 | 30 | 40 | 50 | 60 | |
| 1:0 | 0 | 1.0 | 3.4 | 4.7 | 6.7 | 8.2 | 9.9 | 7.5 |
| 1:1 | 0 | 0.84 | 2.4 | 3.9 | 4.9 | 6.6 | 7.5 | 7.0 |
| 1:2 | 0 | 0.21 | 2.0 | 3.8 | 5.0 | 6.4 | 6.8 | 13.0 |
| 1:4 | 0 | 0.42 | 2.2 | 4.2 | 4.4 | 7.5 | 8.8 | 11.0 |

As clearly indicated in Table 2 and FIG. 3, the polymerization inhibition time at TBP:Acid ratios of 1:1 and 1:0 is significantly less than at ratios of 1:2 and 1:4. This reduction in inhibition time has a marked effect upon the overall continuous HIPS production process. The reduction in inhibition time advantageously results in increased free radical initiator efficiency, decreased residence time in the initial polymerization zone and an increased production rate without the necessity of providing additional equipment.

According to the process of the present invention, the adverse effects of acid decomposition by-products of free radical initiators, such as t-butylperoxybenzoate, dibenzoyl-peroxide and the free radical initiators listed in Table 1, are avoided by careful selection of the free radical initiator. The choice of free radical initiator is an important aspect of the present invention. Suitable free radical initiators are those which do not form acid by-products upon decomposition. The useful free radical initiators decompose to form innocuous decomposition by-products which do not react with the free radical initiator or other components of the polymerization system, such as antioxidant or styrene monomer, to inhibit the styrene polymerization reaction. Since the decomposition by-products are recycled to polymerization zones in the system, the decomposition by-products must not react with the free radical initiator so as to deactivate the free radical initiator and must not function as chain terminators for the styrene polymerization reaction.

Examples of free radical initiators useful in the present process include azo-compounds such as 2,2'-azo-bis-isobutyronitrile and 2,2'-azo-bis(2,4-dimethyl valeronitrile); and peroxy compounds such as peroxydicarbonates such as di(n-propyl)peroxydicarbonate; di(sec-butyl)peroxydicarbonate; di(2-ethylhexyl)peroxydicarbonate; dialkyl peroxides such as dicumyl peroxide; 2,5-dimethyl-2,5-di(t-butylperoxy)hexane; t-butyl cumyl peroxide; bis(t-butyl peroxy isopropyl)benzene; di-t-butyl peroxide; 2,5-dimethyl-2,5-di(t-butylperoxy)-hexyne-3; hydroperoxides such as 2,5-dihydroperoxy-2,5-dimethylhexane; cumene hydroperoxide; t-butyl hydroperoxide; t-amyl hydroperoxide; peroxyketals such as n-butyl-4,4-bis(t-butylperoxy)valerate; 1,1-di(t-butylperoxy)-3,3,5-trimethyl cyclohexane; 1,1-di(t-butylperoxy)cyclohexane; 1,1-di(t-amylperoxy)cyclohexane; 2,2-di(t-butylperoxy)butane; ethyl-3,3-di(t-butylperoxy)butyrate; t-butyl peroctoate and 1,1-di(t-butylperoxy)cyclohexane blend; 2,2-di(t-amyl-peroxy)-propane; and ethyl-3,3-di(t-amylperoxy)butyrate. Of these free radical initiators, the peroxy ketal compounds are preferred, particularly ethyl-3,3-di(t-butylperoxy)-butyrate and 1,1-di(t-butylperoxy)cyclohexane.

Of course, the specific free radical initiator or combination of initiators will be determined within the bounds of the invention by the desired process parameters such as rate of polymerization reaction, degree of polymerization, reactor temperatures, degree of grafting, and the like. The amount of free radical initiator to be used is from 10 to 2000 ppm, preferably 50 to 600 ppm, based on the total content of the polymer system in the first polymerization reactor.

Although the invention has been described with reference to particular embodiments thereof, it will be apparent to those skilld in the art that various changes and modifications can be made without departing from the spirit of the invention or from the scope of the appended claims.

What is claimed is:

1. A continuous process for producing high impact polystyrene, comprising:

polymerizing a mixture of at least one vinyl-aromatic monomer and a rubber in a polymerization reactor, said polymerization being initiated by a free radical initiator which decomposes to form at least one initiating radical and substantially only non-acidic decomposition by-products;

feeding said mixture to a pre-heater to heat said mixture and produce a heated mixture;

feeding said heated mixture to a devolatilizer to remove volatile components including some unreacted monomer and said non-acidic decompositon by-products of the free radical initiator from said heated mixture, thereby producing a high impact polystyrene; and feeding said volatile components as a recycle stream to said polymerization reactor;

wherein introduction of the non-acidic decomposition by-products in the recycle stream into the polymerization reactor does not inhibit polymerization of the vinylaromatic monomer; and wherein the non-acidic decomposition by-products do not react with the free radical initiator to inhibit polymerization of the vinylaromatic monomer.

2. A process of claim 1, further comprising the steps of:

polymerizing said mixture of the vinylaromatic monomer and the rubber in a first polymerization reactor to a degree above an inversion point of said mixture;

feeding said mixture into at least a second polymerization reactor to further polymerize said mixture prior to feeding said mixture to said pre-heater.

3. A process of claim 2, wherein said first polymerization reactor is a continuously stirred tank reactor.

4. A process of claim 3, wherein said second polymerization reactor is a linear-flow reactor.

5. A process of claim 4, further comprising the step of feeding said mixture to at last one additional linear-flow reactor prior to heating said mixture in said preheater.

6. A process of claim 1, wherein said free radical initiator is added to said mixture in an amount of 10-2000 ppm based on a total content of said mixture.

7. A process of claim 6, wherein said amount is 50-600 ppm based on a total content of said mixture.

8. A process of claim 1, wherein said free radical initiator is an azo compound.

9. A process of claim 8, wherein said azo compound is at least one member selected from the group consisting of 2,2'-azo-bis-isobutyronitrile and 2,2'-azo-bis(2,4-dimethyl valeronitrile).

10. A process of claim 1, wherein said free radical initiator is a peroxy compound.

11. A process of claim 10, wherein said peroxy compound is at least one member selected from the group consisting of peroxydicarbonates, dialkyl peroxides, hydroperoxides and peroxyketals.

12. A process of claim 1 wherein said free radical iniatiator is at least one member selected from the group consisting of ethyl-3,3-di(t-butylperoxy)butyrate and 1,1-di(t-butylperoxy)cyclohexane.

13. A continuous process for producing high impact polystyrene comprising:

feeding at least one vinylaromatic monomer, a rubber and a free radical initiator to a first continuously stirred tank reactor to form a first mixture therein;

maintaining said first continuously stirred tank reactor at a temperature at which said free radical initiator decomposes, said free radical initiator decomposing to form at least one initiating radical and non-acidic decomposition by-products;

polymerizing said first mixture in said first continuously stirred tank reactor to a point below an inversion point of the first mixture, said polymerization being initiated by a reaction of said initiating radical with said vinyl aromatic monomer;

feeding said first mixture to a second continuously stirred tank reactor;

polymerizing said first mixture in said second continuously stirred tank reactor to a point above the inversion point of the first mixture to produce a second mixture;

feeding said second mixture to a series of at least two linear-flow reactors to further polymerize said second mixture and produce a third mixture, wherein the degree of polymerization of said second mixture increases in each of said linear-flow reactors;

feeding said third mixture to a pre-heater to heat said third mixture and produce a heated mixture;

feeding said heated mixture to a devolatilizer to remove volatile components including some unreacted monomer and said non-acidic decomposition by-products of the free radical initiator from said heated mixture, thereby producing a high impact polystyrene; and feeding said volatile components as a recycle stream to said first continuously stirred tank reactor;

wherein introduction of said non-acidic decomposition by-products in the recycle stream into said first continuously stirred tank reactor does not inhibit polymerization of said vinyl-aromatic monomer; and wherein a reaction between said non-acidic decomposition by-products and said free radical initiator in said first continuously stirred tank reactor does not inhibit polymerization of said vinylaromatic monomer.

* * * * *